Sept. 8, 1925.

G. T. REICH 1,552,732

METHOD OF TREATING WASTE ORGANIC MIXTURES

Original Filed April 1, 1924    2 Sheets-Sheet 1

Inventor

Gustave T. Reich.

By Lyon & Lyon

Attorneys.

Inventor
Gustave T. Reich.
By Lyon & Lyon
Attorneys.

Patented Sept. 8, 1925.

1,552,732

UNITED STATES PATENT OFFICE.

GUSTAVE T. REICH, OF ANAHEIM, CALIFORNIA.

METHOD OF TREATING WASTE ORGANIC MIXTURES.

Original application filed April 1, 1924, Serial No. 703,572. Divided and this application filed January 5, 1925. Serial No. 599.

*To all whom it may concern:*

Be it known that I, GUSTAVE T. REICH, a citizen of the United States, residing at Anaheim, in the county of Orange and State of California, have invented a new and useful Method of Treating Waste Organic Mixtures, of which the following is a specification.

This invention relates to a method of treating waste organic mixtures and the like, and refers particularly to a method for manufacturing fertilizer, potash salts and hydrochloric acid from such waste organic mixtures as contain either organic nitrogen or potassium compounds, or both, the invention being particularly useful for treating such waste organic mixtures or "distillery slop" derived from the production of ethyl alcohol by the fermentation of molasses.

This application is a division of my copending application Serial Number 703,572, filed April 1, 1924.

Heretofore organic mixtures, such as distillery slop and the like, have been frequently discarded as waste products. The material as such is not suitable for the production of fertilizer. Upon an attempt to dry such material there is formed a hydroscopic product which thereafter cakes and cannot be properly spread. While the material might be dried by the use of some inert filler material, the bulk of the product would thereby be so increased as to render the resulting product of little value. Organic materials such as distillery slop contain considerable part of their potash content in the form of potassium chloride and in this form the potash is generally considered of low value as a fertilizer ingredient. Furthermore, in the production of commercial fertilizers, it is generally necessary to bring the fertilizer within certain desired percentages of potassium compounds and organic nitrogen, and the mere drying of such organic waste material provides no means by which the amount or relative proportions of these materials can be fixed.

An object of the present invention is to provide a method of treating organic materials such as distillery slop by which: first, a non-hydroscopic fertilizer can be produced without necessitating the use of filler; second, a method derived by which all the potassium chloride originally present in the organic material can be converted into a more valuable product; third, a method provided by which the organic nitrogen contained in the fertilizer can be increased over and above that derivable from the organic material; fourth, a method provided by which the quantities or relative proportions of potassium compounds and organic nitrogen in the finish fertilizer can be controlled as desired so as to produce a commercial fertilizer; fifth, a method provided by which the fertilizer may be freed from chlorine compounds; sixth, a method provided by which valuable potassium compounds can be separated as by-products; seventh, a method provided by which the concentrated hydrochloric acid may be recovered from such organic material at relatively low cost.

Various other objects and advantages of the present invention will appear from the following description of the preferred form or example of the process embodying the invention, the process being described as it is carried out by means of a preferred form of apparatus forming the subject matter of the divisional application previously referred to. This apparatus is diagrammatically illustrated in the accompanying drawings, in which—

Figure 1:
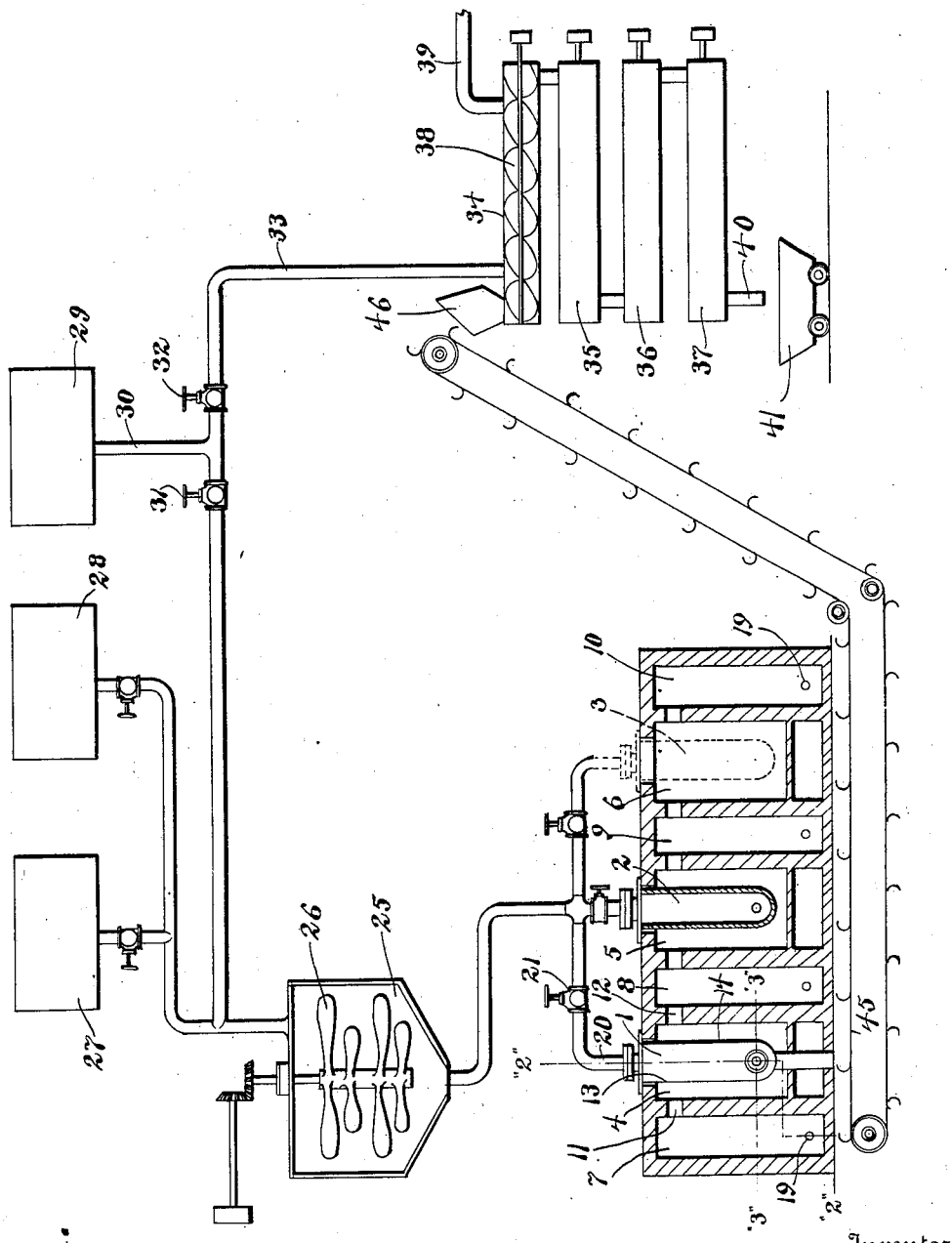
Figure 1 is a diagrammatic illustration, certain parts being indicated in vertical section.
Figure 2:
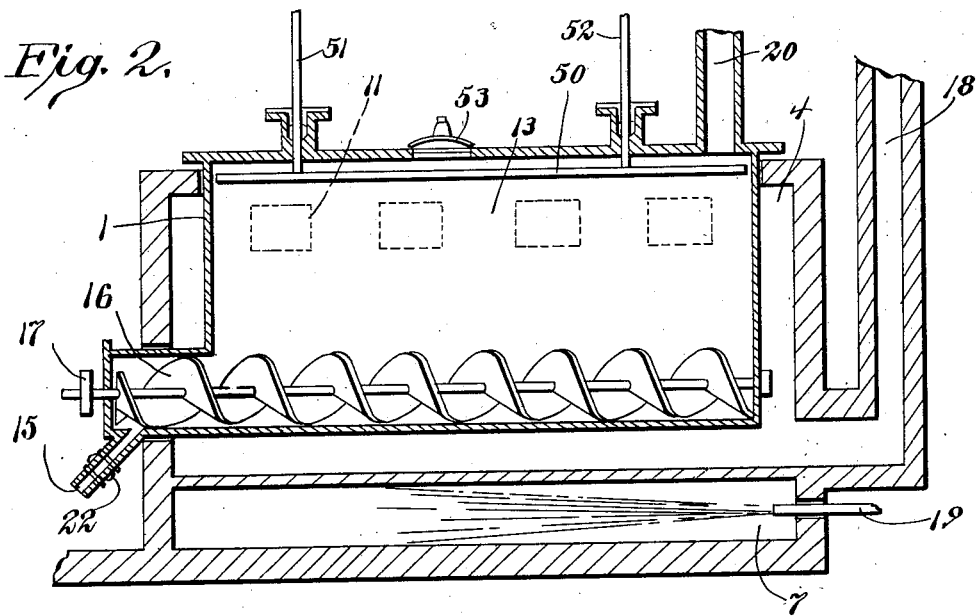
Fig. 2 is an enlarged cross section of one of the retorts and its heating chamber, and is indicated as taken on the line 2—2 of Fig. 1.
Figure 3:
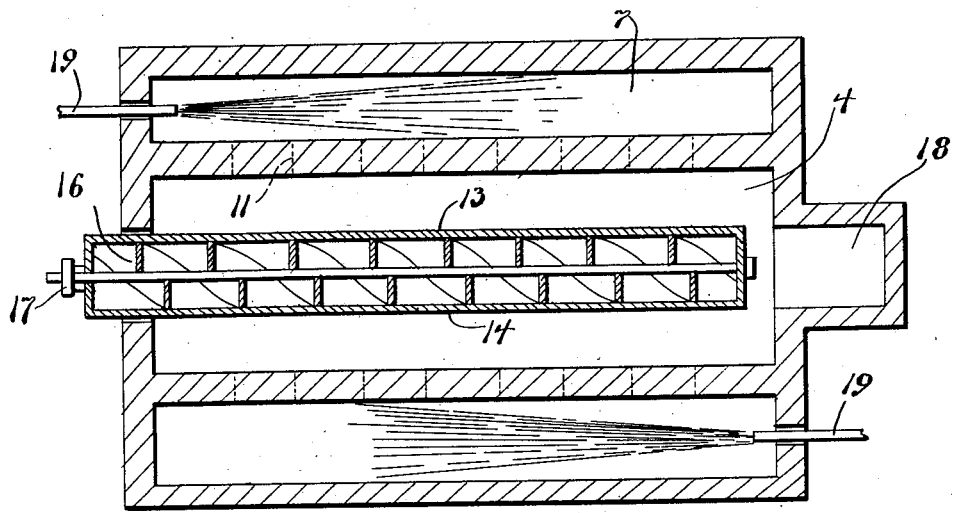
Fig. 3 is a plan section of one of the retorts and its heating and combustion chambers, and is indicated as taken mainly on the line 3—3 of Fig. 1.

Referring to the drawings 1, 2 and 3, respectively, designate different retorts of a battery of retorts, these retorts being mounted in heating chambers 4, 5 and 6, respectively, formed in a single furnace having combustion chambers 8 and 9 between the heating and combustion chambers 7 and 10 at opposite ends. Said combustion chambers 7, 8, 9 and 10, respectively, preferably communicate with adjacent heating chambers through similar passages 11. The passage for combustion gases may be controlled by any additional means, such as dampers, to enable any one of the retorts to be cut out for repairs.

The passages 11 are preferably disposed near the upper portion of the dividing walls between the heating and combustion chambers and thereby permit more intense heat to be applied to the upper portions of the said walls of the retorts and in this way the contents of each retort may be intensively heated at its upper strata which prevents ebullition of its contents. Flues, or the like, may be employed throughout the furnace to secure a more uniform distribution of heat longitudinally upon the retort walls.

Each retort is provided with an outlet spout 15 through which the material in the retort may be discharged by operation of a screw conveyor 16 which is indicated as operated by a pulley 17, although any other preferred means may be substituted. The gases from the several heating chambers are led to a chimney 18 where they are discharged. These gases may be initially heated by any suitable means, such as the oil burners 19.

20 indicates similar inlet pipes for the several retorts 1, 2 and 3, these pipes preferably each being provided with a suitable valve 21. The outlet spouts 15 are also preferably each provided with a valve 22. The retorts 1, 2 and 3 preferably receive their charge from a stirring or agitating chamber 25 equipped with suitable agitating means 26. The material to be treated is introduced into the chamber 25 from a storage tank 27 for the waste organic material. 28 indicates a second storage vessel which holds one of the treating reagents, such as ammonium sulphate, and 29 indicates a third storage vessel for acid, such as sulphuric acid. The acid may be passed through a line 30 and hence by the proper regulation of valves 31 and 32 either to the mixing and agitating chamber 25 or through a line 33 to an acid liberating apparatus.

This acid liberating apparatus is indicated as comprising a plurality of treating chambers 34, 35, 36 and 37, respectively, arranged in series, each chamber having a feed and agitating member such as a screw conveyor 38, the last chamber being indicated as discharging through an outlet pipe 40 into a receiving car 41. 39 indicates a vapor line for hydrochloric acid gas or vapor formed in the acid liberating apparatus.

Each of the retorts 1, 2 and 3 are indicated as provided with a diaphragm plate 50 attached to rods 51 and 52 slidable in bearings in the top wall of the furnace by which the diaphragm plates 50 may be lowered upon the contents of the retorts so as to compress the same and assist the screw conveyor 16 in discharging the contents of the retorts from the spouts 15. The material discharged from the spouts 15 is received upon the conveyor 45 which preferably deposits the material through the hopper 46 into the first treating chamber 34 of the acid liberating apparatus.

The operation of the process as carried out in the preferred apparatus, may now be described:

The waste organic material to be treated may of course vary widely in its composition. As an example of the practical process, however, distillery slop obtained as a waste product from the preparation of ethyl alcohol from cane molasses, generally contains upon the dry basis approximately 3% of organic nitrogen and 10% of potash ($K_2O$). Of this potash content generally about 2½% is present as potassium sulphate ($K_2SO_4$), approximately 4% is present as potassium chloride (KCl) and approximately 3½% of the potash may be present as potassium combined with organic matter of unknown chemical composition. This material is first brought to the desired concentration and this is introduced into the chamber 25 from the storage tank 27. The concentration at which the material is supplied to the chamber 25 provides one of the means by which control of the character of the final fertilizer is obtained. The proper concentration, however, will best be understood from the description of the reactions to be performed. However, for example, at 30° Bé. this distillery slop or organic mixture will generally contain approximately 50% of water and 50% of solids. Thus, by introducing two thousand pounds of the mixture into the chamber 25 there will be present twenty-five pounds of potash ($K_2O$) present as potassium sulphate, forty pounds of potash present as potassium chloride, and thirty-five pounds of potash present as potassium combined with organic matter. Into the chamber 25 is then also introduced a reagent adapted to combine certain of the potassium compounds to form a potassium compound of greater value as a fertilizer medium, or a material adapted to combine with the potassium in combination with organic matter to increase the organic nitrogen content of the fertilizer, or a material adapted to facilitate removal of chlorine from the product to be produced, or a material or mixture of different materials for any one or all of these purposes.

As an example, ammonium sulphate may be introduced into the chamber 25 from the storage vessel 28, this material being one adapted to react both with the potassium chloride and potassium organate and will convert all the potassium present to potassium sulphate and at the same time react with the potassium combined with organic matter present, forming a compound of ammonium and the organic matter and increasing the organic nitrogen content, and also to form ammonium chloride, thereby converting the chlorine present into a compound from which the chlorine may be more readily expelled from the fertilizer to be produced, as concentrated hydrochloric acid, leaving a high grade fertilizer and producing a valuable by-product. Thus, for example, 125 pounds of ammonium sulphate may be added and will be sufficient to combine with all the potassium chloride and compound of potassium organic matter present. These materials may be agitated together in the chamber 25 and then the admixture is run into the retorts 1, 2 and 3.

In case, however, such a process would finally produce a fertilizer having an excess of potash content over that desired in a commercial fertilizer, a part of the potash content may be first removed before the introduction of the admixture into the retorts. Potassium sulphate is only partly soluble in water and by proper control of the concentration of the distillery slop or organic mixtures introduced into the chamber 25, the excess potassium sulphate can be caused to precipitate out in the chamber 25 and may be filtered from the admixture or separated in any other suitable manner, such as by centrifuging. Thus it is understood that the original concentration of the distillery slop is regulated so that in case there exists a higher potassium content than desired in the finished fertilizer, the excess potassium is precipitated in form of potassium sulphate in the chamber 25. In this case, the process results in an extremely valuable by-product as well as provide a method of correctly determining the percentage or proportion of potash which will be present in the final fertilizer.

In case the reaction between the ammonium sulphate and the remaining mixture will produce a fertilizer having an excess of nitrogen, the nitrogen content can be regulated by substituting for part of the ammonium sulphate an acid, such as sulphuric acid. The quantity of acid used will vary according to the requirements of the fertilizer but will preferably not exceed that necessary to combine with the compound of potassium organic matter. The acid will likewise convert this compound to potassium sulphate. This acid is understood as being supplied from the storage vessel 29 to the chamber 25.

The admixture, with or without the separation of potassium sulphate, is then introduced into the retorts. Here the admixture is heated to dehydrate the same and form a dry product. The temperature to which the mixture should be heated should not exceed that at which the nitrogen compounds break down and generally will be less than 300° Cent., although even lower temperatures may be necessary with some materials.

During this retorting operation, part of the organic materials other than the nitrogen compounds may be decomposed without destroying the value of the final product as fertilizer.

The dry material is then expelled. The material then may be employed as fertilizer but preferably is carried by the conveyor 45 and distributed through hopper 46 into the acid recovery apparatus in order to first free the fertilizer from chlorine compounds, and, second, to obtain hydrochloric acid in concentrated form therefrom, which is a valuable by-product. By the addition of approximately seventy-eight pounds of sulphuric acid in the example given, there is liberated from the dry fertilizer thirty-one pounds of hydrochloric acid which passes out through pipe 37. The final fertilizer freed from the chlorine compounds is continuous through the apparatus, being positive through outlet 40 and into the receiving car 41. One advantage of this invention is that by the treatment herein described, I am able to recover hydrochloric acid at a low temperature from the fertilizer, i. e., a temperature below that at which the nitrogen compounds are decomposed.

It may be pointed out that by treatment of the original waste organic material with sulphuric acid, hydrochloric acid could not be liberated from potassium chloride, except at a temperature which would destroy the organic matter and nitrogeneous compounds of the residual material. By conversion of the potassium chloride to potassium sulphate and ammonium chloride, hydrochloric acid gas may be liberated therefrom by sulphuric acid or other acid of relatively higher boiling point than the hydrochloric acid to be liberated at a low temperature, even atmospheric temperature, if desired.

The residue resulting from the described treatment is a non-hydroscopic material suitable for fertilizer, preferably by admixture with a phosphate compound, and the process provides a method by which the quantities and relative proportions of potassium and nitrogen compounds can be brought within any desired range as required in different commercial fertilizers, and the fertilizer is also freed of chloride salts and hence not injurious to some crops.

While ammonium sulphate and sulphuric acid have been particularly described as suitable treating agents, it is understood that various other materials may be substituted therefore without departing from the invention. Thus, for example, in place of ammonium sulphate, other ammonium compounds, such as ammonium carbonate, chloride phosphate, or nitrate, may be substituted. Of these, each of the mentioned substitute will be suitable for acting upon the compound of potassium and organic matter for increasing the organic nitrogen by forming a compound of ammonium and organic matter.

The carbonate phosphate and nitrate may react with the potassium chloride to facilitate freeing of the compounds from chlorides, the nitrate also increasing the nitrogen of the fertilizer. Also, in place of sulphuric acid, other acids may be employed such, for example, as nitric acid.

Various modifications may be made in the details of the invention herein described, without departing from the spirit of the invention. The invention is, therefore, not limited to the specific process or processes described, but is of the scope set forth in the appended claims.

I claim:

1. A method of treating organic mixtures containing organic nitrogen and potassium compounds, which includes treating the mixtures with ammonium sulphate to convert the potassium compounds to potassium sulphate.

2. A method of treating organic mixtures containing organic nitrogen and potassium chloride, which includes treating the mixtures with ammonium sulphate to form potassium sulphate, and then treating with sulphuric acid to liberate hydrochloric acid.

3. A method of treating organic mixtures containing organic nitrogen and potassium compounds, which includes treating the mixtures with ammonium sulphate to form potassium sulphate, precipitating part of the potassium sulphate, and separating the same from the admixture.

4. A method of treating organic mixtures containing organic nitrogen and potassium compounds, which includes treating the mixtures with ammonium sulphate to form potassium sulphate, precipitating and separating from the admixture part of the potassium sulphate, and then treating the liquid with sulphuric acid to liberate hydrochloric acid.

5. A method of treating organic mixtures containing organic nitrogen and potassium compounds, which comprises treating the mixture with ammonium sulphate and sulphuric acid to convert the potash compounds to sulphates.

6. A method of treating organic mixtures containing organic nitrogen and potassium compounds including chlorides, which comprises treating the mixtures with sulphuric acid and ammonium sulphate to convert the potassium compounds to sulphates and to form ammonium chloride, and then treating the mass with acid having a relatively higher boiling point than hydrochloric acid to liberate hydrochloric gas.

7. A method of treating organic mixtures containing organic nitrogen and potassium compounds including chlorides, which comprises treating the mixtures with sulphuric acid and ammonium sulphate to convert the potassium compounds to sulphates, and precipitating and removing part of the sulphates formed.

8. A method of treating organic mixtures containing organic nitrogen and potassium compounds including chlorides, which comprises treating the mixtures with sulphuric acid and ammonium sulphate to convert the potassium compounds to sulphates and to form ammonium chloride, precipitating and removing part of the sulphate formed, and liberating hydrochloric acid gas from the mass by use of an acid of relatively higher boiling point than hydrochloric acid.

9. A process of producing fertilizer from organic mixtures comprising treating such mixtures with an agent adapted to react with the organic matter of the mixture to increase the organic nitrogen content.

10. A process of producing fertilizer from organic mixtures comprising treating such mixtures with an agent adapted to facilitate the liberation of hydrochloric acid gas and to increase the organic nitrogen content, and subsequently treating the mixture with an acid of relatively higher boiling point than hydrochloric acid to liberate such gas.

11. A process of producing fertilizer from organic mixtures comprising treating such mixtures with a sulphate to convert the potassium compounds to sulphate, with an ammonium compound to convert the chlorides of the mixture to ammonium chloride, and precipitating part of the potassium sulphate from the mixture, and treating with acid of relatively higher boiling point than hydrochloric acid to liberate hydrochloric acid gas.

12. A process of treating organic mixtures containing potassium compounds, which includes treating the mixtures with an agent adapted by double decomposition with the potassium compounds to form a less soluble potassium compound, and separating part of such latter compound from the admixture.

13. A process of treating organic mixtures containing potassium compounds, which includes treating the mixtures with an agent adapted by double decomposition with the potassium compounds to form a less soluble potassium compound.

Signed at Anaheim, California, this 15th day of December, 1924.

GUSTAVE T. REICH.